April 1, 1969
H. FOLKERTS
3,435,902
TRACTOR HITCH FOR DRAFT IMPLEMENT
Filed Jan. 17, 1967
Sheet 1 of 2
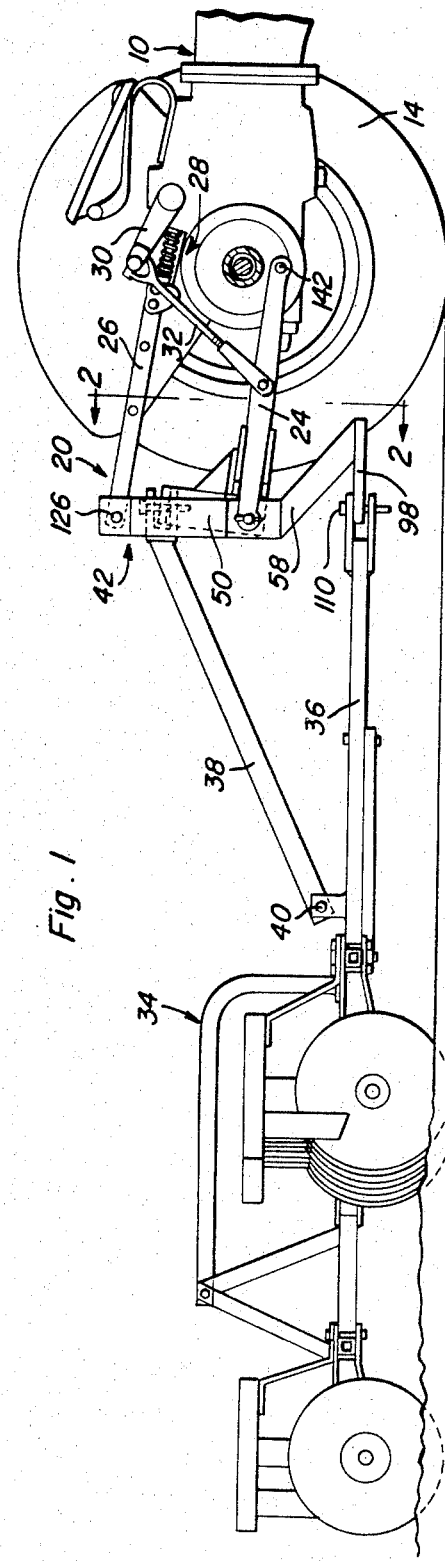
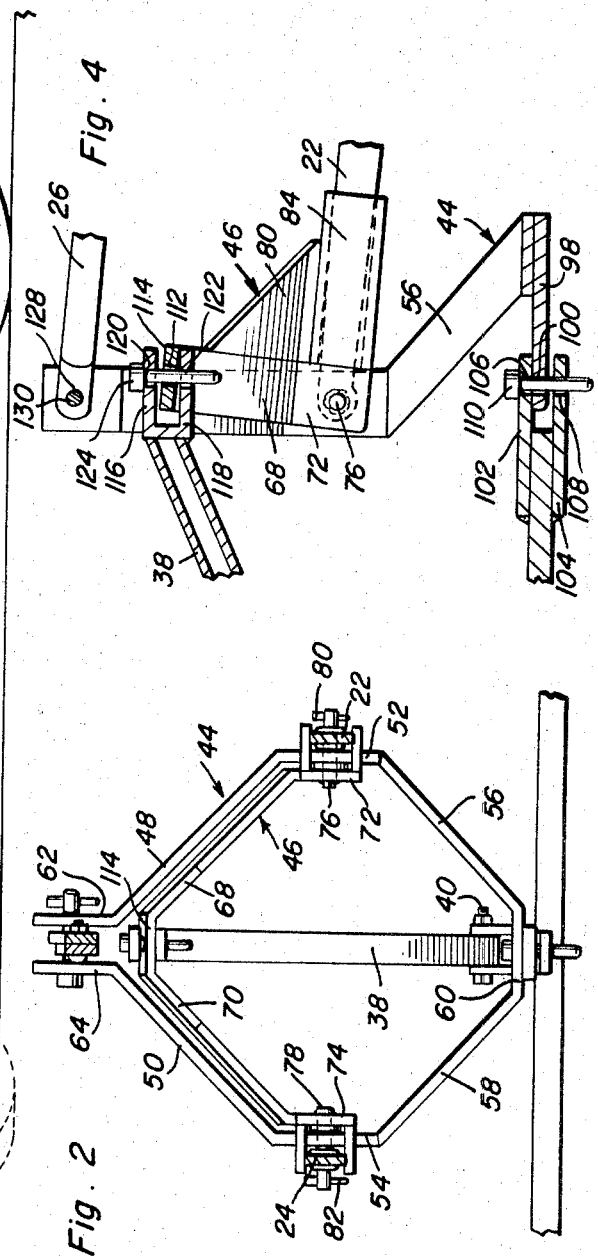
Henry Folkerts
INVENTOR.
BY Clarence A. O'Brien
and Harvey B. Jacobson
Attorneys April 1, 1969  H. FOLKERTS  3,435,902
TRACTOR HITCH FOR DRAFT IMPLEMENT
Filed Jan. 17, 1967  Sheet 2 of 2
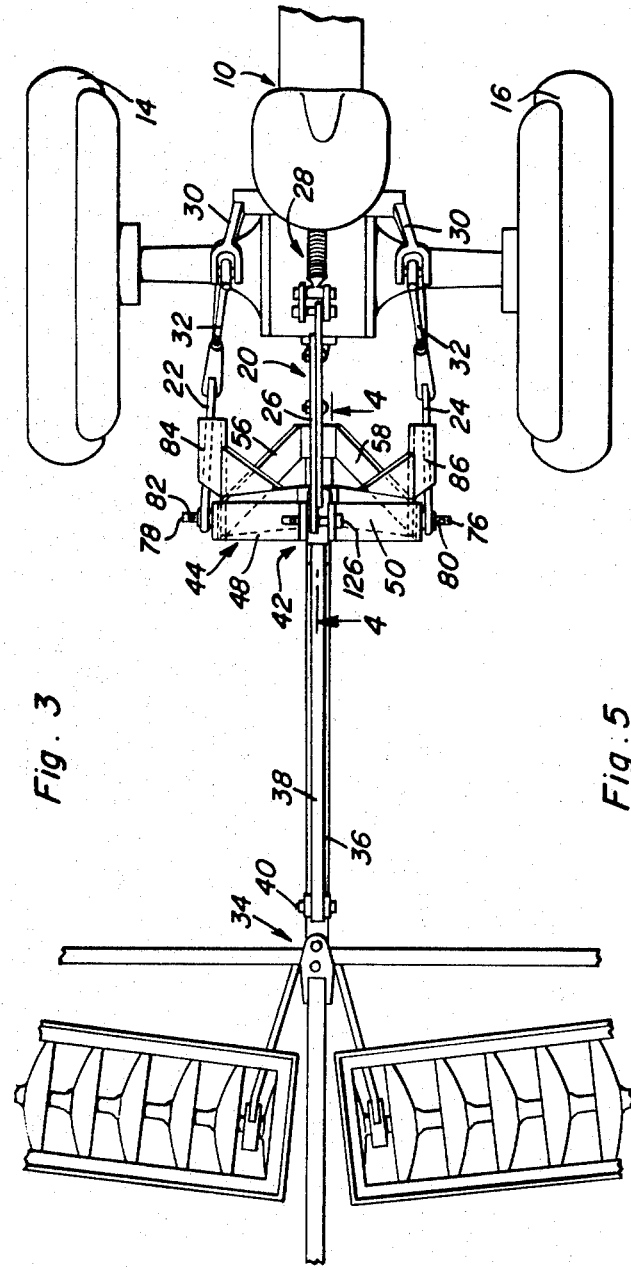
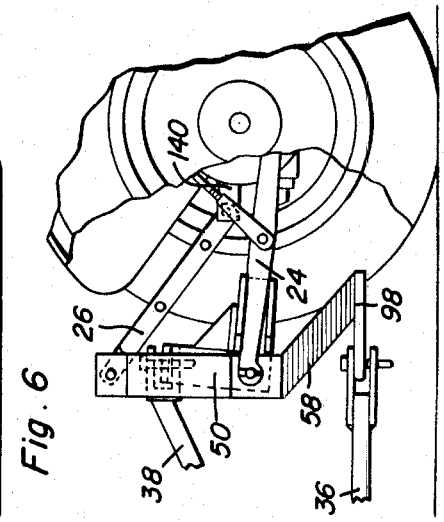
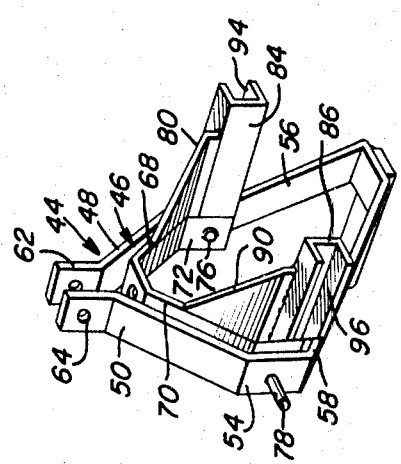
Henry Folkerts
INVENTOR.

United States Patent Office 3,435,902
Patented Apr. 1, 1969

3,435,902
TRACTOR HITCH FOR DRAFT IMPLEMENT
Henry Folkerts, R. Rte. 1, Outlook, Wash. 98938
Filed Jan. 17, 1967, Ser. No. 609,960
Int. Cl. A01b 63/11; B60d 1/02
U.S. Cl. 172—239                                10 Claims

ABSTRACT OF THE DISCLOSURE

An implement hitch for a tractor including a pair of rearwardly projecting and upwardly swingable hitch lift arms and operative to support a portion of the weight of an associated draft implement in cantilever fashion behind a tractor in response to increased drag on the tractor by the draft implement so as to automatically more heavily load the rear wheels of the tractor and thereby increase their tractive power.

---

This invention relates to a novel and useful implement hitch adapted to be utilized on a conventional tractor of the type including rearwardly projecting and upwardly swingable hitch means and to operatively couple a draft implement to the tractor in a manner such that the load carried by the rear wheels of the tractor will automatically be increased, independently of or in conjunction with an automatic tractor draft system, as the drag of an associated draft implement on the tractor is increased. Further, the implement hitch of the instant invention is adapted specifically for use with draft implements of the type including forwardly projecting tongue portions whose forward ends are to be pivotally secured to a tractor for oscillation about a vertical axis relative to the tractor.

The main object of this invention is to provide an implement hitch for a tractor operative, independent of or in conjunction with automatic controls of the tractor hitch lift arms, to automatically increase the load on the rear driving wheels of an associated tractor in response to an increase of drag by an associated draft implement on the tractor.

Another object of this invention, in accordance with the immediately preceding object, is to provide an implement hitch specifically adapted for use in conjunction with draft implements including forwardly projecting tongue portions adapted to be pivotally secured to an associated tractor for oscillation about a vertical axis relative to the tractor.

Yet, another object of this invention is to provide an implement hitch including structural features adapting it for ready securement to existing tractor hitch lift arms.

A final object of this invention to be specifically enumerated herein is to provide an implement hitch in accordance with the preceding objects which will conform to conventional forms of manufacture, be of simple construction and automatic in operation so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view illustrating the implement hitch of the instant invention operatively connecting a draft implement to the rear end of a farm tractor, portions of the tractor being broken away and illustrated in longitudinal vertical section;

FIGURE 2 is an enlarged transverse vertical sectional view taken substantially upon the plane indicated by the section line 2—2 of FIGURE 1;

FIGURE 3 is a top plan view of the assemblage illustrated in FIGURE 1;

FIGURE 4 is an enlarged fragmentary longitudinal vertical sectional view taken substantially upon the plane indicated by the section line 4—4 of FIGURE 3;

FIGURE 5 is a perspective view of the implement hitch; and

FIGURE 6 is a fragmentary side elevational view similar to FIGURE 1 but somewhat abbreviated in form and illustrating a slightly different manner of operatively connecting the implement hitch of the instant invention to an associated tractor.

Referring now more specifically to the drawings the numeral 10 generally designates a conventional form of farm tractor including a pair of rear driving wheels 14 and 16 and a conventional three-arm lift hitch referred to in general by the reference numeral 20 including a pair of lower opposite side lift arms 22 and 24 and an upper arm 26 operatively connected to an automatic draft system assembly generally referred to by the reference numeral 28 at its forward end, the draft system 28 comprising a part of the conventional tractor 10 and operative, upon a forward thrust directed thereon by the arm 26, to cause the control arms 30 thereof to effect an upward lift on the arms 22 and 24 through the connecting links 32 connecting the arms 30 to the arms 22 and 24.

A draft implement is generally referred to by the reference numeral 34 and includes a forwardly projecting tongue portion 36 and a forwardly and upwardly inclined lift arm 38. The rear lower end of the lift arm 38 is pivotally secured to the rear end of the tongue portion 36 by means of a pivot fastener 40 and it may therefore be seen that the forward upper end of the lift arm 38 may be swung through a vertical plane extending longitudinally of the tongue portion 36.

The draft implement 34 is connected to the hitch 20 by means of the implement hitch of the instant invention which is generally referred to by the reference numeral 42. The implement hitch 42 includes a first upstanding perimeter frame 44 and a second upstanding and generally inverted U-shaped frame referred to in general by the reference numeral 46. The frame 44 includes a pair of downwardly divergent upper portions 48 and 50 terminating at their lower ends in downwardly directed generally vertical opposite side portions 52 and 54 which in turn terminate at their lower ends in downwardly convergent lower portions 56 and 58 whose lower ends are spaced apart and interconnected by means of a transversely extending generally horizontal center lower portion 60. The upper ends of the upper portions 48 and 50 are spaced apart and terminate in upwardly directed generally vertical upper portions 62 and 64, the various aforementioned portions of the first perimeter frame 44 all being rigidly connected together to form an integral rigid frame.

The second upstanding frame 46 includes a pair of downwardly divergent upper portions 68 and 70 disposed inwardly of and generally paralleling the upper portions 48 and 50 and which terminate in downwardly directed generally vertically disposed opposite side portions 72 and 74 disposed inwardly of and generally paralleling the opposite side portions 52 and 54.

The opposite side portions 52 and 54 and 72 and 74 are provided with aligned bores and a pair of pivot pins 76 and 78 are secured through the opposite side portions 72 and 74 and are rotatably received through the bores formed in the opposite side portions 52 and 54. The remote ends of the pivot pins 76 and 78 project outwardly of the opposite side portions 52 and 54 and are rotatably received through the apertured rear ends of the lift arms 22 and 24, the rear ends of the lift arms 22 and 24 being retained on the pins 76 and 78 by means of suitable removable fasteners 80 and 82 secured through the extreme remote end portions of the pins 76 and 78. Further, the second upstanding frame 46 includes a pair of longitudinally extending and generally parallel channel members 84 and 86 carried by and projecting forwardly of the opposite side portions 72 and 74 and triangular gusset plates 88 and 90 are secured between the channel members 84 and 86 and the upper portions 68 and 70 of the frame 46.

The channel members 84 and 86 define elongated recesses 94 and 96 which open in opposite directions and embracingly receive therein the rear ends of the lift arms 22 and 24. The center lower portion 60 of the perimeter frame 44 includes a horizontally disposed rearwardly projecting member 98 including an upstanding bore 100 formed through its rear end and the forward end of the tongue portion 36 includes vertically spaced furcations 102 and 104 including vertically aligned bores 106 and 108. The rear end of the member 98 is receivable between the furcations 102 and 104 with the bore 100 aligned with the bores 106 and 108 and a removable pivot pin 110 is passed through the bores 100, 106 and 108 to pivotally secure the forward and of the tongue portion 36 to the lower portion of the first upright perimeter frame 44. Further, from FIGURES 1, 4, 5 and 6 of the drawings it may be seen that the lower portions 56 and 58 are forwardly and downwardly inclined as well as downwardly convergent so as to place the bore 100 in substantial vertical alignment with a similar bore 112 formed through the center upper portion 114 of the frame 46 which interconnects the upper ends of the upper portions 68 and 70 of the frame 46.

The forward upper end portion of the inclined lift arm 38 includes vertically spaced furcations 116 and 118 provided with aligned vertical bores 120 and 122 and between which the upper portion 114 is receivable with the bore 112 aligned with the bores 120 and 122 in order that the latter may receive therethrough a pivot fastener or pin 124 so as to pivotally secure the forward upper end of the lift arm 38 to the upper portion 114 of the frame 46.

The spaced apart generally vertically disposed portions 62 and 64 of the frame 44 receive therebetween the rear end of the arm 26 and are provided with horizontally aligned bores 126 registrable with a similar bore 128 formed through the rear end of the arm 26, a pivot fastener 130 being passed through the bores 126 and 128 so as to pivotally secure the rear end of the arm 26 to the upper portion of the frame 44.

In operation, an increase in drag of the draft implement 34 on the tractor 10 will cause the first frame 44 to pivot at least slightly about the pivot pins 76 and 78 in a clockwise direction as seen in FIGURE 1 of the drawings whereupon the upper end of the frame 44 will push forwardly on the arm 26, the latter in turn pushing forwardly on the automatic draft system 28 to actuate the latter and cause the control arms 30 to lift up on the lift arms 22 and 24 and thereby raise the frame 46. Upward movement of the frame 46 will of course cause the inclined lift arm 38 to lift upwardly on the rear end of the tongue portion 36 so as to support at least a portion of the weight of the forward portion of the draft implement 34 in cantilever fashion from the rear of the tractor 10 causing the rear driving wheels 14 and 16 of the tractor 10 to be more heavily loaded and to therefore be given better traction. Of course, the draft system 28 is adjustable and therefore may be set as desired so as to automatically increase the loading of the rear wheels 14 a predetermined amount in response to a given increase in rearward pull on the member 98 and decrease the loading of the rear wheels 14 in response to a decrease in the rearward pull on the member 98, the increase and decrease in loading of the wheels 14 being effected by an increase and decrease in transfer of the weight of the front of the tractor 10 to the wheels 14 by an increase and decrease, respectively, of the portion of the weight of the implement 34 being supported in cantilever fashion from the rear of the tractor 10 by the hitches 42 and 20.

In that form of the invention illustrated in FIGURE 6 the arm 26 is not pivotally connected at its forward end to an automatic draft system such as draft system 28 but to a rearwardly projecting mounting lug 140 carried by the rear axle housing of the tractor 10. The arm 26 is forwardly and downwardly inclined at approximately 45° relative to the horizontal and accordingly, a rearward pull on the member 98 by the tongue portion 36 has a tendency to swing the frame 44 about the forward horizontal pivot axis 142, see FIGURE 1, of the lift arms 22 and 24 and therefore the frame 46 to be lifted upwardly and exert an upward pull on the draft implement 34 through the inclined lift arm 38. It may therefore be seen that the draft implement hitch 42 of the instant invention is operable independently of the automatic draft system 28 and that the implement hitch 42 is therefore adapted to be utilized in conjunction with substantially all conventional tractors in lieu of a drawbar carried by a conventional tractor hitch for the purpose of pulling a draft implement such as draft implement 34.

In addition to the two forms of the invention illustrated in FIGURES 1 and 6, a third form (not shown) is also envisioned which includes an additional elongated connecting link to be used on the structure of FIGURE 1 and including elongated connecting link means pivotally secured at its rear end to the upper portion of frame 46 and at its forward end to the rear ends or arms 30, this additional connecting link means being usable with or without the channel members 84 and 86 and specifically adapted for use in conjunction with tractors including lower link arms actuating means for the draft system thereof.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. An implement hitch for a draft implement and adapted to be used in connection with a tractor hitch of the type including a pair of opposite side lift arms, said implement hitch comprising a first upright lift frame having opposite side portions spaced below its upper end portion adapted to be mounted on the free ends of said lift arms for swinging movement therewith against free pivotal movement relative to said lift arms, a second upright actuating frame including opposite side portions spaced vertically between the upper and lower end portions thereof and pivotally supported from said opposite side portions of said first lift frame for oscillation about an axis extending between said opposite side portions, the upper and lower end portions of said lift and actuating frames, respectively, being adapted for pivotal connection to vertically spaced portions of a draft implement tongue for rotation about generally aligned upright axes, the upper end portion of said actuating frame being adapted for pivotal securement to the rear end of a third upper tractor hitch arm or link having its forward end supported from an associated tractor.

2. The combination of claim 1 wherein said first frame includes recess means on its opposite side portions adapted to embracingly receive the rear end portions of said tractor hitch lift arms therein.

3. The combination of claim 2 wherein said recess means comprise elongated generally horizontally disposed and parallel and horizontally outwardly opening recesses opening outwardly of said opposite side portions of said first frame.

4. The combination of claim 3 wherein said recesses are defined by a pair of generally parallel and horizontally disposed channel members carried by said opposite side portions of said first frame.

5. The combination of claim 1 wherein said first frame opposite side portions are disposed between and adjacent said opposite side portions of said second frame.

6. The combination of claim 1 wherein said first frame is in the form of a perimeter frame disposed in an upright plane extending between the opposite side portions of said first frame.

7. The combination of claim 6 wherein said second frame is generally rectangular in shape and disposed with one pair of diagonally opposite corner portions disposed uppermost and lowermost, the other pair of diagonally opposite corner portions defining said opposite side portions of said second frame.

8. The combination of claim 7 wherein said first frame is generally inverted U-shaped in vertical transverse sectional shape with its apex portion disposed within said uppermost corner portion.

9. The combination of claim 8 wherein said first frame includes recess means on its opposite side portions adapted to embracingly receive the rear end portions of said tractor hitch lift arms therein.

10. The combination of claim 9 wherein said recess means comprise elongated generally horizontally disposed and parallel and horizontally outwardly opening recesses opening outwardly of said opposite side portions of said first frame.

References Cited

UNITED STATES PATENTS 2,456,693  12/1948  Fraga _____ 172—7
2,663,239  12/1953  Rapp et al. _____ 172—10

ABRAHAM G. STONE, *Primary Examiner.*

STEPHEN C. PELLEGRINO, *Assistant Examiner.*

U.S. Cl. X.R.

172—7; 280—456